United States Patent
Brooks et al.

(10) Patent No.: US 9,953,053 B2
(45) Date of Patent: Apr. 24, 2018

(54) RELIABILITY IMPROVEMENT OF DISTRIBUTED TRANSACTION PROCESSING OPTIMIZATIONS BASED ON CONNECTION STATUS

(71) Applicant: International Business Machines Corporation, Armonk, NY (US)

(72) Inventors: Michael D. Brooks, Southampton (GB); Ian J. Mitchell, Eastleigh (GB); Philip I. Wakelin, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 14/574,918

(22) Filed: Dec. 18, 2014

(65) Prior Publication Data

US 2016/0182298 A1 Jun. 23, 2016

(51) Int. Cl.
*H04L 12/24* (2006.01)
*G06F 17/30* (2006.01)
*H04L 12/58* (2006.01)
*H04L 29/08* (2006.01)

(52) U.S. Cl.
CPC .... *G06F 17/30377* (2013.01); *H04L 41/0836* (2013.01); *H04L 51/24* (2013.01); *H04L 67/1012* (2013.01); *H04L 67/1025* (2013.01)

(58) Field of Classification Search
CPC ........... G06F 17/30377; H04L 67/1025; H04L 41/0836; H04L 51/24; H04L 67/1012
See application file for complete search history.

(56) References Cited

U.S. PATENT DOCUMENTS

| | | | |
|---|---|---|---|
| 5,261,089 A | 11/1993 | Coleman et al. | |
| 6,457,041 B1 | 9/2002 | Hutchison | |
| 6,505,249 B1* | 1/2003 | Rehkopf | H04L 29/06 |
| | | | 702/182 |
| 6,513,024 B1* | 1/2003 | Li | G06N 99/005 |
| | | | 706/13 |

(Continued)

OTHER PUBLICATIONS

U.S. Appl. No. 14/127,946, Wuji Chen.*

(Continued)

*Primary Examiner* — Philip Chea
*Assistant Examiner* — Wuji Chen
(74) *Attorney, Agent, or Firm* — Daniel R. Simek

(57) ABSTRACT

A method, computer program product, and system for resolving a potential in-doubt condition of a distributed transaction, is provided. A processor receives a request to commit a transaction for a distributed transaction protocol that includes an applied process, the transaction includes a transfer of a commit decision from a coordinating node to a participating node. The processor checks the service status of the connection to the participating node, and finding the service status of the connection out of service or unavailable, the processor instructs the coordinating node to back-out (rollback) the transaction. Additionally, locality meta-data is used as an indication of reliability of the connection to the participating node, and in response to determining the participating node locality to be a remote network connection, the processor instructs the coordinating node to abort the applied process and send a standard distributed transaction protocol message over unreliable connections.

7 Claims, 4 Drawing Sheets

(56) References Cited

U.S. PATENT DOCUMENTS

| | | | |
|---|---|---|---|
| 6,668,340 B1* | 12/2003 | Baker | G06F 11/3688 714/26 |
| 7,165,061 B2 | 1/2007 | K et al. | |
| 7,712,096 B2 | 5/2010 | Kaczynski et al. | |
| 7,917,470 B2 | 3/2011 | Barnes et al. | |
| 7,975,138 B2 | 7/2011 | Andrade | |
| 8,856,091 B2 | 10/2014 | Wong et al. | |
| 8,924,352 B1* | 12/2014 | Andruss | G06F 11/1461 707/640 |
| 9,384,229 B2 | 7/2016 | Mitchell et al. | |
| 2002/0138443 A1* | 9/2002 | Schran | G06Q 20/382 705/64 |
| 2003/0018624 A1* | 1/2003 | Hsiao | G06F 17/30094 |
| 2004/0044992 A1* | 3/2004 | Muller | G06F 11/3684 717/124 |
| 2004/0044993 A1* | 3/2004 | Muller | G06F 11/3684 717/124 |
| 2004/0128651 A1* | 7/2004 | Lau | G06F 11/3664 717/124 |
| 2004/0153383 A1 | 8/2004 | K et al. | |
| 2005/0015641 A1* | 1/2005 | Alur | G06F 11/1458 714/2 |
| 2006/0136887 A1* | 6/2006 | Kaczynski | G06F 9/466 717/151 |
| 2007/0067587 A1* | 3/2007 | Rossi | G06F 11/1461 711/162 |
| 2007/0143827 A1* | 6/2007 | Nicodemus | G06F 21/6218 726/2 |
| 2008/0059610 A1* | 3/2008 | Lin | G06F 9/5061 709/220 |
| 2008/0086719 A1* | 4/2008 | Clemenceau | G06F 9/44505 717/121 |
| 2008/0183309 A1* | 7/2008 | Beers | G06F 9/4411 700/17 |
| 2009/0217274 A1* | 8/2009 | Corbin | G06F 9/466 718/101 |
| 2010/0146514 A1* | 6/2010 | Alexander | G06F 11/3688 718/104 |
| 2011/0066708 A1* | 3/2011 | Schran | G06Q 20/382 709/221 |
| 2013/0019242 A1* | 1/2013 | Chen | H04L 41/145 718/1 |
| 2013/0035909 A1* | 2/2013 | Douady | 714/37 |
| 2013/0066948 A1* | 3/2013 | Colrain | H04L 67/146 709/203 |
| 2013/0066949 A1* | 3/2013 | Colrain | G06F 9/466 709/203 |
| 2013/0304714 A1* | 11/2013 | Lee | G06F 9/466 707/703 |
| 2014/0279922 A1* | 9/2014 | Kottomtharayil | G06F 9/505 703/2 |

OTHER PUBLICATIONS

U.S. Appl. No. 14/824,404, filed Aug. 12, 2015.
List of IBM Patents or Patent Applications Treated as Related (Appendix P), filed herewith.
Barnes et al., "Logging Last Resource Optimization for Distributed Transactions in Oracle WebLogic Sever", EDBT 2010, Mar. 22-26, 2010, Lausanne, Switzerland, Copyright 2010 ACM.
Kang, Amy, "Last Agent Optimization for JMS Bridge Transacted Link", Dec. 8, 2009, <https://mq.java.net/4.5-content/jmsbridge-last-agent-opt.txt>.
"Automated and optimised heartbeat function for IP connections", An IP.com Prior Art Database Technical Disclosure, Authors et. al.: Disclosed Anonymously, IP.com No. 000220090, IP.com Electronic Publication: Jul. 20, 2012, pp. 1-3.
"Logging Last Resource Transaction Optimization", Oracle, Copyright © 2014, Oracle Corporation and/or its affiliates, <http://docs.oracle.com/cd/E13222_01/wls/docs92/jta/llr.html>.
"Optimised heartbeat function for IP connections based on partner locality", An IP.com Prior Art Database Technical Disclosure, Authors et. al.: Disclosed Anonymously, IP.com No. 000228530, IP.com Electronic Publication: Jun. 17, 2013, pp. 1-2.

* cited by examiner

RELIABILITY IMPROVEMENT OF DISTRIBUTED TRANSACTION PROCESSING OPTIMIZATIONS BASED ON CONNECTION STATUS

BACKGROUND OF THE INVENTION

The present invention relates generally to the field of distributed transaction processing, and more particularly to use of connection status techniques to reduce occurrences of in-doubt occurrences of distributed transaction processing.

A distributed transaction is the execution of one or more units of work distributed on different systems. A distributed commit protocol is required to ensure that the effects of a distributed transaction are atomic, that is, either all the effects of the transaction persist or none persist, whether or not failures occur. A well-known commit protocol is the two-phase commit (2PC) protocol. For transaction processing applications such as hotel reservations, airline reservations, stock market transactions, or banking applications, the commit processing takes up a substantial part of the transaction. Therefore, the performance of a commit protocol substantially affects the transaction volume that a system can support.

The "last agent commit process", is an optimization of the distributed two-phase commit protocol, and is a widely used optimization to improve the performance of commit processing. Last agent commit optimization reduces time-consuming message sending and log writes, between a transaction manager (TM), coordinating the transaction, and a remote resource participant within the distributed processing system. In providing an optimization of the two-phase commit protocol, the last agent commit process removes the prepare phase message for the last participant, and the coordinating participant sends a commit message to the last participant, with all other participants having prepared and confirming a commit vote to proceed. The last participant determines the last vote of whether to proceed with the commit of the transaction process or back-out and roll back the transaction. The last agent commit process creates a potential large period of in-doubt failure between the last remote write and receipt of a commit or back-out (rollback) message.

The period between when a distributed transaction participant has prepared its own recoverable state and voted yes to commit, and the time when it is instructed to perform the commit (or perform a back-out if some failure or no vote was received at some point within the subsequent distributed prepare processing), is known as the "in-doubt" window. Units of work are said to be in-doubt during this time, as they are not yet aware of whether they will need to commit or back out, and access to data involved in the transaction remains locked-out for use by other pending transactions.

SUMMARY

According to one embodiment of the present invention, a method, computer program product, and system for resolving a potential in-doubt condition of a distributed transaction, is provided. The method for preventing an in-doubt condition of a distributed transaction, includes a processor that receives a request to commit a transaction of a distributed transaction protocol including an applied process, the transaction including a coordinating node and a participating node. The processor determines a service status of a connection to the participating node, and in response to determining the service status of the connection to be unavailable, the processor instructing the coordinating node to back-out the transaction.

According to another embodiment of the present invention, the method for resolving a potential in-doubt condition of a distributed transaction, includes the processor that determines a locality of a connection to the participating node, and in response to determining the locality of the connection to be a remote network connection, the processor instructs the coordinating node to abort the applied process of the distributed transaction protocol and alternatively perform a standard distributed transaction protocol process.

DETAILED DESCRIPTION

Figure 1:
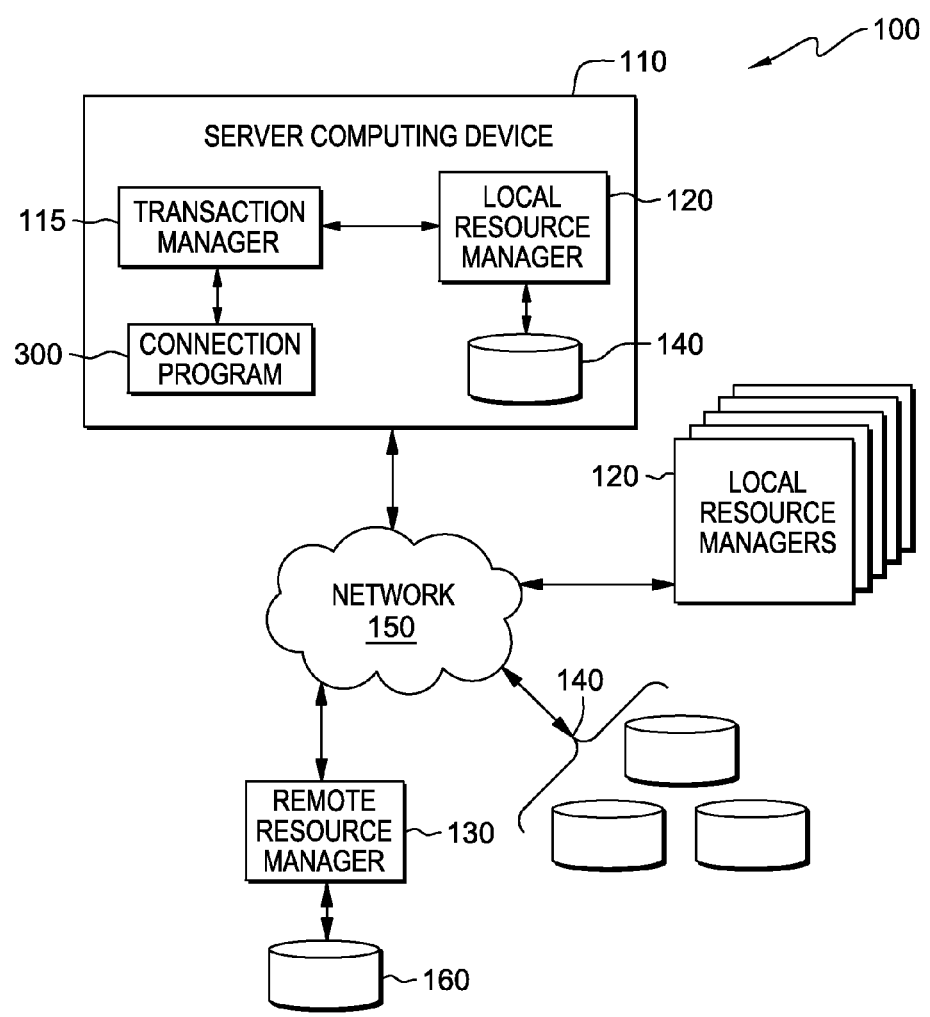
FIG. 1 is a functional block diagram illustrating a distributed transaction processing environment, in accordance with an embodiment of the present invention.

Embodiments of the present invention, recognize that applied process optimizations of distributed transaction processing protocols, such as last agent commit process optimization of a two phase commit protocol, may result in an in-doubt condition due to failed or unreliable communication connections between two or more transaction system participants. An applied process of a distributed transaction protocol, such as a last agent commit optimization process, is when the coordinator node of a distributed transaction instructs all but one (n-1) of its (n) participant nodes to prepare themselves, and assuming they prepare and each votes yes to a commit, the coordinating participant then sends a message to the final ($n^{th}$) unit of work to commit. Using and applied process to optimize the distributed transaction avoids a network flow to the last agent participant. In applying the last agent commit optimization process, the coordinator has effectively passed the coordination role of the transaction units of work, to the $n^{th}$ system, and the original coordinator now becomes an in-doubt participant in the sync point.

The unit of work in the $n^{th}$ system (now the coordinator of the sync point) will either be able to commit to perform the unit of work, or not. If the unit of work can be performed, the $n^{th}$ system sends a response message to the original coordinator that it has committed. The response message effectively passes the coordination role back to the unit of work of the original coordinator, which had been in-doubt while it awaited the response. The original coordinator can now commit its own recoverable resource updates, then instruct the n-1 participant units of work to commit themselves (they are all in-doubt with respect to it until this point) Likewise, if the last agent coordinator unit of work had been unable to commit, and had backed-out its changes instead, then the response would have been passed back along with the coordination role to the original coordinating system, which had been in-doubt while it awaited the response. The original coordinator can now back out its own recoverable state changes, then tell the n-1 participant units of work to back out their respective changes (again, they are all in-doubt with respect to it until this point).

The period between when a participant has prepared its own recoverable state and voted yes to commit to a unit of work of a transaction, and the time when the participant is instructed to perform the commit (or perform a back-out if some failure or a "no" vote was received at some point within the distributed prepare processing) is known as the in-doubt window. Units of work are said to be in-doubt during this time, as they are not yet aware of whether they will need to commit or back-out. An in-doubt condition results in a relatively long interruption of processing, and data resources are locked out, unavailable to other transaction processes.

Embodiments of the present invention recognize that interruption or delay of connections between systems participating in a distributed transaction processing environment, producing an in-doubt condition, results in lengthy delays and loss of transactional efficiency intended by applying transaction optimization processes, such as the last agent commit process. Some embodiments recognize that remote participating systems are more likely to experience connection reliability issues, as compared to local connections, due to propagating through additional network connection points and competing with additional communication network traffic.

Some embodiments of the present invention make use of a non-transactional network verification function and meta-data associated with distributed transaction connections, to identify failed or unreliable connections and significantly reduce the likelihood of transactions becoming in-doubt for optimization processes applied to a two-phase commit protocol. A connection status monitoring the service status of a connection to participating nodes of the transaction, is maintained by the transaction process system. Inactive connections are confirmed to prevent the flow of last agent commit messages in the event of failed network connections. Additionally connection locality meta-data is used to determine whether a connection is reliable, and thus whether to apply last agent commit processing or standard two-phase commit processing for the transactions, thus reducing the probability of encountering an in-doubt condition.

Detailed embodiments of the claimed methods, computer program products, and systems, are disclosed herein; however, it is to be understood that the disclosed embodiments are merely illustrative, and other embodiments may be implemented in various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods, computer program products, and systems of the present disclosure.

The present invention will now be described in detail with reference to the figures. FIG. 1 is a functional block diagram illustrating a distributed computer processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

FIG. 1 is a functional block diagram illustrating distributed transaction processing environment 100, in accordance with an embodiment of the present invention. Distributed transaction processing environment 100 includes server computing device 110, local resource manager 120, remote resource manager 130, local database 140, and remote database 160, all interconnected via network 150. Server computing device 110 is depicted as hosting transaction manager 115 and connection program 300.

Networks 150 may be, for example, a local area network (LAN), a telecommunications network, a wide area network (WAN), such as the Internet, a virtual local area network (VLAN), or any combination that can include wired, wireless, or optical connections. In general, network 150 can be any combination of connections and protocols that will support communications between server computing device 110, local resource manager 120, and remote resource manager 130, within distributed computer processing environment 100, in accordance with embodiments of the present invention.

Local resource manager 120 is a resource manager that receives transaction processes from applications to perform units of work of a transaction. Local resource manager 120 is controlled by transaction manager 115, which oversees the execution of application processes by distributing units of work to available resource managers, such as local resource manager 120 and remote resource manager 140. Local resource manager 120 is depicted as under direct access of transaction manager 115, and within a local cluster of server computing device 110, as determined by connection locality meta-data, which may include such information as machine specific location, LAN, TCP/IP, sub-network, and cluster communication information.

In some embodiments of the present invention, local resource manager 120 participates in global transaction processing, in which a transaction protocol may be applied to perform transaction units of work. For example, a two-phase commit protocol may be used by transaction manager (TM) 115 and local resource 120 to perform transaction processing, to attain an atomicity in transaction processing. Additionally, an optimization process may be applied to the two-phased commit protocol, such as a last agent commit process, to improve the efficiency and performance of the transactions under a distributed transaction protocol, such as the two-phased commit protocol.

A last agent commit optimization involves the transaction coordinator communicating to all but one of the participating nodes, to prepare to perform a unit of work of a transaction. The transaction coordinator confirms that all but one participant can perform the work, by each participant voting yes to a commit. Confirming the commit by all but one participant, the transaction coordinator communicates a message to the final participant to commit. The coordinator has effectively passed the coordination role to the final participant in another system to determine if the transaction proceeds or is backed out. The unit of work in the other system will determine if it is able to commit or not. If the decision communicated back to the original transaction coordinator is that it has committed, then the commit message is received by the original transaction coordinator, which again assumes the coordinator role, and communicates to the other participants, which had been in-doubt while awaiting the response from the final participant, to commit to their respective units of work of the transaction. Likewise, if the last participant with a unit of work assigned by the transaction manager, had been unable to commit, and had backed out its changes instead, then a back out response would have been passed back along with the coordination role to the original transaction coordinator, which had been in-doubt while it awaited the response. The original coordinator can now back out its own recoverable state changes, then direct the other participants to back out (roll back) the units of work they had performed.

Database 140 is an example of a resource that includes data that can be acted upon by a resource manager. Database 140 is accessible by local resource manager 120, which is capable of performing transaction units of work on data within database 140.

Remote resource manager 130 is a remote resource manager, located as part of a wide area network relative to server computing device 110. Resource manager 130 is determined to be remote based on connection locality meta-data, which may include such information as machine specific location, LAN, TCP/IP, sub-network, and cluster communication information, for example. Resource manager 130 receives instructions via a connection with transaction manager 115, as a transaction coordinator, which oversees the execution of application processes by distributing units of work to available resource managers, such as resource manager 130. In some embodiments in which a last agent commit process optimization is applied to perform a distributed transaction process, remote resource manager 130 is a remote participant, having a unit of work to perform for a transaction coordinated by transaction manager 115.

Database 160 is an example resource that includes data accessible and managed by resource manager 130, which is enlisted by transaction manager 115 to perform transaction units of work using the data of database 160.

Server computing device 110 may be a desktop computing device, a rack mounted computing device, a blade server, a management server, a mobile computing device, or any other electronic device or computing system capable of performing program instructions, and receiving and sending data. In other embodiments, server computing device 110 may represent a computing system utilizing multiple computers as a server system, such as in a cloud computing environment. In yet other embodiments, server computing device 110 may be a laptop computer, a tablet computer, a netbook computer, a personal computer (PC), a desktop computer, a personal digital assistant (PDA), a smart phone, or any programmable electronic device capable of communicating with local resource managers 120 and remote resource manager 130, via network 150. In another embodiment, server computing device 110 may be a computing system utilizing clustered computers and components (e.g., database server computer, application server computers, etc.) that act as a single pool of seamless resources when accessed within distributed computer processing environment 100. Server computing device 110 may include internal and external hardware components, as depicted and described with reference to FIG. 4.

Server computing device 110 is depicted as including transaction manager 115 and connection program 300. In some embodiments of the present invention, server computing device 110 performs application process operations that include transactions distributed across a transaction processing environment, such as distributed transaction processing environment 100.

In some embodiments of the present invention, transaction manager 115 is an operational part of a middleware environment residing on server computing device 110, and receives workload from client input of running applications. Transaction manager 115 coordinates the activities of the workload by enlisting resource managers to perform units of work of the transaction workload, such as local resource manager 120 and remote resource manager 130. Transaction manager 115 sends and receives communication messages with resource managers participating in a distributed transaction protocol, such as a two-phased commit protocol, or an optimization process of a distributed transaction protocol, such as a last agent commit process.

In some embodiments of the present invention, connection program 300 is an extension of a network management component of a computing system, such as server computing device 110. The network management component is used to establish the connection between the nodes participating in the transaction, to handle individual messages that are sent and received over the connection, release the connection when it is no longer needed, and process error conditions that may occur during operations. Connection program 300 extends the network management component, and uses input regarding the messaging activity of connections as an indication that a connection to a resource manager is still functioning correctly. Connection program 300 uses meta-data input regarding the locality of a connection as an indicator of the likelihood of reliability.

Connection program 300 determines the status and potential reliability of communications between transaction manager 115 and participating resource managers (nodes) of a distributed transaction, to which an optimization, such as a last agent commit process, has been applied. In some embodiments of the present invention, connection program 300 checks the status of connections to nodes (hereafter, node connections), participating in a distributed transaction, by validating message receipt information of each connection, which is performed by a network management component of the transaction manager host system, such as server computing device 110. For example, the network management component (not shown) of server computing device 110 monitors the receipt of messages from each connection participating in distributed transactions coordinated by transaction manager 115. The network management component sets a flag indicating successful receipt of a message from a particular connection.

In some embodiments of the present invention, the network management component of the transaction manager host system sets a flag for each participant from which a message is successfully received within a defined time interval. At the end of the time interval, a separate examination process determines which node connections have been idle, based on the corresponding flag indicating that a message has not been successfully received from the node connection. If node connections are determined to remain idle at the end of a subsequent time interval, the examination process initiates a heartbeat process, which delivers a heartbeat message for the idle node connections, and the examination process resets the flags for all other node connections participating in the distributed transaction, and begins the next time interval. If a reply to the heartbeat message is received, the connection is determined to be operational, and the flag is set indicating the connection as valid and operational for the current time interval. The examination process continues for all node connections participating in the transaction. The examination process does not initiate a heartbeat message for the node connections having connection flags set to indicate the successful receipt of a message within the time interval, indicating a valid and operational connection. This avoids unnecessary message flow and undo interruption of the examination process.

The heartbeat process is invoked to check the validity of a node connection that appears to be in service but has failed to indicate the successful receipt of a message within consecutive time intervals. Invoking the heartbeat process sends a heartbeat message outside of the transaction band, to the node connections determined to be idle. In some embodiments of the present invention, at the end of the time interval, the network management component determines if any node connection of the distributed transaction does not have a flag set indicating that a message has been successfully received within the time interval.

In some embodiments of the present invention, the examination process and the heartbeat process are separate existing modules, operating outside the transaction process, and working in conjunction with the network management component of the host system and connection program 300. In other embodiments, the examination process and the heartbeat process may be modules of the network management component of the host system.

The connection status maintained by the network management component of the transaction processing system is used to prevent the flow of last agent commit messages across a failed network connection, and the connection locality meta-data is used to determine whether or not a connection is reliable, based on the locality of the connection. Connection program 300 determines the information associated with the connection status of participating nodes, as well as the reliability information of participating nodes, based on the connection locality meta-data, and in one embodiment, sends the information to the transaction manager for decision making of whether to proceed with the last agent commit process or revert to the standard two-phase commit process. In another embodiment, connection program 300 instructs the transaction manager to abort the last agent commit process and alternatively perform a standard two phase commit protocol process, in response to the service status of the connection to the last agent node determined to be unavailable, and in the case of determining the locality of the last commit agent node to be a remote network connection.

Figure 2:
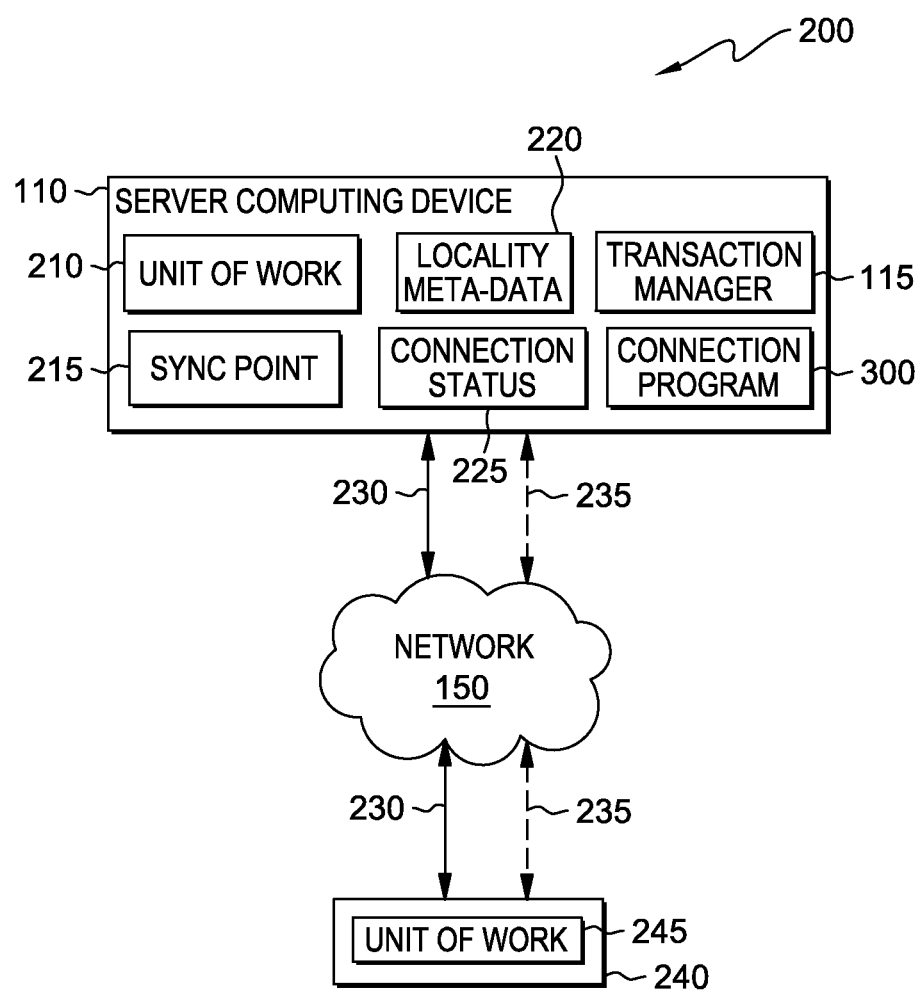
FIG. 2 is a functional block diagram depicting an operational connection between two transaction processing systems of FIG. 1, in accordance with an embodiment of the present invention.

FIG. 2 is a functional block diagram depicting operational connections 200, between two transaction processing systems of FIG. 1, in accordance with an embodiment of the present invention. Depicted in operational connections 200 is server computing device 110, which includes unit of work 210, sync point 215, locality meta-data 220, connection status 225, transaction manager 115, and connection program 300. Also depicted in FIG. 2, connected via network 150, is transaction process connection 230, heartbeat message connection 235, participating node 240, and unit of work 245.

Unit of work 210 is a first component of a transaction to be performed by server computing device 110 and unit of work 245 is a second activity of a transaction to be performed by participating node 240. In a simplified exemplary embodiment of the present invention performance of unit of work 210 and unit of work 245 complete the transaction. Participating node 240 is a resource manager connected via network 150 and transaction process connection 230 to transaction manager 115, of server computing device 110.

Transaction manager 115 performs a coordinating role in the distribution of units of work 210 and 245, of the transaction. In some embodiments of the present invention, while performing a two phase commit protocol of a distributed transaction of operational connections 200, transaction manager 115 initiates a sync point for the commit or rollback decision of units of work 210 and 245. A sync point is used to establish atomicity of a transaction, in which all participating nodes commit their respective unit of work, or all participating nodes back-out the transaction updates and return data to a pre-transaction state. In other embodiments, while applying a last agent commit optimization, transaction manager sends a commit message to participating node 240 and includes information indicating that transaction manager 115 is prepared to commit or rollback unit of work 210, depending on the decision response received from participating node 240. In the last agent commit optimization process, transaction manager has transferred the coordinating role to participating node 245 as the "last agent", and waits in-doubt for a response from participating node 240.

Sync point 215 is established in the two phase commit protocol by transaction manager 115 as the coordinating role of the transaction. Sync point 215 includes sending messages instructing the preparation of performing unit of work 210 and unit of work 245 and receiving confirmation "votes" from participating resource managers, for example, participating node 240, to commit to performing the unit of work, or to back out and rollback the unit of work to the pre-transaction state.

In some embodiments of the present invention, locality meta-data 220 includes information regarding the relative location of resource managers connected and communicating with transaction manager 115. Locality meta-data 220 stores node connection information of participating node 240, performing unit of work 245 for the transaction, and node connection information regarding the performance of unit of work 210 by server computing device 110. The information may include, for example, a specific socket used, determining if the resource performing the unit of work shares the same operating system (as is the case of server computing device 110 and transaction manager 115), determining if the node connection is on the same IP sub-network, or determining if the connection is on a different IP address. The information included in locality meta-data 220 is used to determine if a connection of a participating node in a distributed transaction is local or remote. A local node connection may be within a cluster of interconnected systems within substantially the same location, or may be to a resource manager within the same local area network (LAN). Messages sent to and received from local connections are less likely to experience connection failures related to message-propagating devices, firewalls, and other network events, and thus local connections are considered more reliable than connections that are non-local, or remote. In one embodiment of the present invention, connection program 300 receives information regarding the locality of a node connection from transaction manager 115, and stores the locality information and/or the likely reliability of the connection, in locality meta-data 220. In another embodiment, the information regarding the locality of a node connection is stored in locality meta-data 220 by the network management component of server computing device 110 (not shown).

Connection status 225 functions to record if a successful message has been sent to a participating node connection, and a reply or response has been received, within a defined time interval. At the beginning of the defined time interval, the flags for all node connections are set to a default setting of "off". If a message has been successfully received, the connection is recorded as operational, for example, by setting a flag as "on". If a message has not been successfully received from the connection, the flag remains at a setting of "off". Connection status 225 maintains the status of the connections, also referred to as the service status of the connections of participating nodes, enlisted by transaction manager 115, and associated with performing the distributed units of work of the transaction, such as units of work 210 and 245. During a defined time interval, if a message is received from the node connection with participating node 240, connection status 225 changes the default flag setting of "off", to "on" for the node connection. If, however, during the defined time interval, no message was received from the connection with participating node 240, the flag associated with participating node 240 would remain at the setting of off.

In some embodiments of the present invention, the defined time interval may have lapsed without sending or receiving a message to a participating node, and therefore the status remains at a default setting of off. In order to determine if the connection remains operational, an examination process monitors connection status 225, and identifies the connections that have a status of off, at the end of the defined time interval. The examination process initiates a heartbeat process that generates a "heartbeat" message to the participating nodes that have a connection status of off, to test the connection. The successful transmission and response of a heartbeat message may prevent a firewall from releasing network resources associated with an otherwise idle connection. An unsuccessful transmission and response of a heartbeat message, or an unexpected delay in receiving a response to the transmitted heartbeat message, indicates that there may be a potential problem with the connection, and the connection may be unreliable. Heartbeat messages are not sent to connections whose corresponding connection status flag indicates that the connection has received a message within the defined time interval and is valid. In some embodiments of the present invention, the heartbeat message may be repeated, in response to determining a previously unsuccessful heartbeat message.

In some embodiments of the present invention, connection status 225 resides in system memory and is controlled and accessible by the network management component of server computing device 110, the examination process, and connection program 300. In other embodiments, connection status 225 is included as part of a network management component of a participating or coordinating system within distributed transaction processing environment 100.

Heartbeat message connection 235 is a messaging connection between the network management component of server computing device 110, working in conjunction with transaction manager 115, and participating nodes of the distributed transaction, such as participating node 240. Heartbeat connection 235 is a connection external to the transaction process thread performing units of work 210 and 245 over transaction process connection 230. A heartbeat process is initiated by an examination process subsequent to determining that a participating node connection has failed to indicate the successful receipt of a message in consecutive time intervals. Heartbeat connection 235 carries a heartbeat message to nodes determined to be idle, to initiate a response indicating the connection remains valid and operational. Heartbeat connection 235 carries heartbeat messages only to the node connections indicating an absence of a message received during the defined time interval, to avoid unnecessary flow of messages through the network.

Transaction process connection 230 is a communication connection between transaction manager 115 and participating node 240. In some embodiments of the present invention, transaction process connection 230 is a transmission control protocol of the internet protocol suite (TCP/IP) type of connection. Network packets sent over internet protocol (IP) sockets are buffered by the TCP/IP stack in a "send buffer" memory area. The send buffer accommodates several small messages in its memory, such as a commit message from transaction manager 115, using a last agent commit process optimization. The socket writer for the send buffer will not be blocked regardless of the state of transaction process connection 230, and will transmit messages. If the network encounters a transmission failure, it may not be detected until an acknowledgement packet is not received within a period of time, often in the range of 200 milliseconds. Following the TCP protocol, the message packet will be re-transmitted a number of times until the sending stack reaches a pre-determined limit of retries, and signals a communication error. The re-try period may be in the order of several seconds to minutes, and if the network failure occurs just prior to the sending of a commit message to a participating node as the last agent, there is no reliable way for the sending system to detect the failure. The sending node and other nodes of a multi-node transaction using last agent commit optimization, remain in-doubt due to the undetected connection failure, and continue to hold resources in a lock-out state, anticipating a decision to commit or back out of performing the units of work.

Use of heartbeat messages sent to connections determined to be idle within a defined time interval, enables the detection of failed or delayed connections. The determination of failed or delayed connections, along with the connection reliability information of connection status 225, may be used by transaction manager 115, to make a decision to defer from using a process optimization, such as last agent commit process, and instead proceed with a standard two phase commit protocol.

Figure 3:
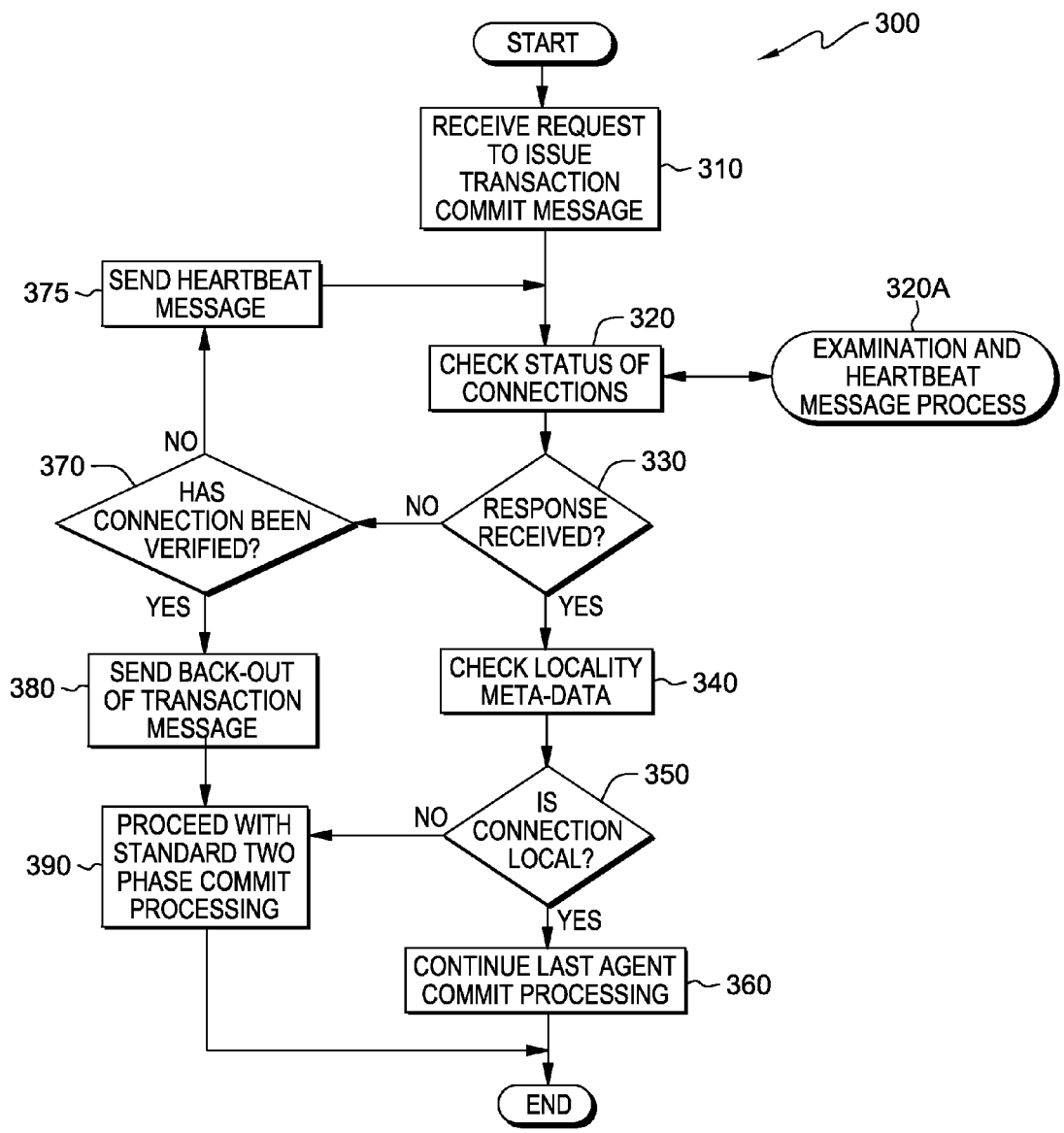
FIG. 3 illustrates operational steps of a connection program, inserted on a client device within the data processing environment of FIG. 1, in accordance with an embodiment of the present invention.

FIG. 3 illustrates operational steps of connection program 300, inserted on a client device within the data processing environment of FIG. 1, in accordance with an embodiment of the present invention. Connection program 300 operates in an environment of connected systems potentially utilizing a two phase commit protocol optimization process, such as a last agent commit process. Connection program 300 receives a request to issue a transaction commit message (step 310). The transaction manager receives a request from an application process to commit to a transaction. The architecture of the distributed transaction may have different configurations that include all nodes directly connected to the transaction manager, or a tree structure of nodes, in which the coordinating transaction manager may have nodes that are also transaction managers. The transaction manager issues a "prepare" instruction to all directly connected nodes, except for one node. The node excluded from the prepare instruction is the agent of the last agent commit optimization process. The nodes receiving a prepare instruction determine whether an assigned unit of work can be performed, and return a message vote to commit to the unit of work, or return a back out vote if some condition exists in which the unit of work cannot be performed. If even one of a multitude of nodes returns a vote to back out, all units of work of the transaction are backed out, and results in a rollback of the transaction to a pre-transaction state.

For example, transaction manager 115 receives a request to issue a commit instruction from an application process. Transaction manager 115, operating a distributed transaction protocol utilizing the last agent commit optimization process, sends a prepare message to local resource managers 120, but does not send a prepare message to resource manager 130. Resource managers 120 receive the prepare message and unanimously determine to commit to the respectively assigned units of work of the transaction, or if at least one of resource managers 120 does not vote to commit to perform the respective unit of work of the transaction, the units of work are backed out and a rollback to a pre-transaction state occurs.

Connection program 300 checks the status of the connections of participating nodes of the transaction (step 320). In some embodiments of the present invention, connection program 300 receives connection status input of participating nodes in the distributed transaction process, indicating if node connections are valid and operational within a defined time interval. If a message has been successfully received from a participating node, within the defined time interval, the connection to the node is determined to be valid. In one embodiment of the present invention, a valid node connection is indicated by an "on" flag corresponding to the node connection. If the node has been idle with regard to messages received and acknowledged, the connection status of an "off" designation, for example, would be indicated and the connection considered to possibly be non-operational.

For example, Connection program 300 checks connections status 225 to determine if the connection flag corresponding to resource manager 130 is on or off. In some embodiments of the present invention, the flag designations may be considered as, "yes" or "no", "true" or "false", "active" or "inactive", or any designation that differentiates between successfully receiving and not receiving a response to a message, from a node, during the defined time interval.

In other embodiments of the present invention, connection program 300 accesses the status condition of the participating node connections to determine if node connections are valid and operational, as determined within the current defined time interval.

The status of node connections is maintained and updated by an examination process and heartbeat process (input step 320A). The information indicating the service status of the connections to the participating nodes, also referred to as the connection status, in some embodiments of the present invention, is maintained by the setting of a flag, corresponding to a particular connection of a node participating in the distributed transaction. In some embodiments, the network management component of the transaction manager host system, updates a flag corresponding to a particular node connection upon the successful receipt of a message from the particular node. An examination process, scheduled at a defined time interval, determines if a flag corresponding to a node connection indicates a failure to successfully receive a message within the defined time interval. The examination process identifies the idle node connection, initiates a heartbeat process that sends a heartbeat message to the idle node connection, and resets the flags for all node connections of the distributed transaction. The examination process continues, and the network management component of the system hosting the transaction manager continues to update flags of corresponding node connections when messages are successfully received. In other embodiments of the present invention, a connection establishment protocol may be used to determine a state of the connection to a participating node.

Connection program 300 determines whether a node connection is operational within the defined time interval (decision step 330), and determining that the node connection is not operational (step 330, "NO" branch), connection program 300 sends a message to the transaction manager to rollback the transaction (step 370) In some embodiments of the present invention, determining if the node connection is not operational involves connection program 300 determining whether the node connection has remained idle for consecutive defined time intervals, which indicates that in a separate process, a heartbeat message has been sent to the idle connection, for example, without successful receipt of a response message. Connection program 300 determines from the service status of the connection of the participating node that the connection remains idle. The connection status indicates a lost or problematic connection. Sending an instruction to the transaction manager, or sending information to the transaction manager to decide to rollback (backout) the transaction, enables the transaction manager to notify all other nodes participating in the transaction to rollback their respective units of work. The rollback instruction returns all units of work to their respective pre-transaction state, and releases the lock placed on the resources involved in the transaction. In some embodiments an error message may be generated by the network management component of the coordinating system if the connection remains unresponsive. For example, having confirmed the connection status as idle subsequent to consecutive defined time intervals, in which at least one heartbeat message was sent to the idle connection, connection program 300 determines that the connection is not operational, and generates a message sent to transaction manager 115 advising a rollback of all nodes participating in the current transaction.

Having sent a rollback message to the transaction manager, connection program 300 sends a message to the transaction manager (TM) advising the TM to proceed with a standard two phase commit processing (step 380). Connection program 300 recognizes the non-operational node, which may potentially be designated as a last agent node, and due to the unreliability of the node connection, advises the transaction manager to proceed with a standard two phase commit protocol process, avoiding an in-doubt condition.

For example, transaction manager enlists local resource manager 120 and remote resource manager 130 for a distributed process transaction. Connection program 300 checks the connection status of remote resource 130 and determines that the connection has been idle for at least two consecutive defined time intervals of the examination process, and sends a message to transaction manager 115 to rollback the transaction for all nodes participating in the distributed transaction process. Connection program 300 sends a message to transaction manager 115 advising a standard two phase commit process to be used for the transaction. Having sent the instruction to proceed with a standard two phase commit process, connection program 300 ends.

Reverting back to decision step 330, connection program 300, having determined that a response has been received from the connection to the participating node within the defined time interval (step 330, "YES" branch), connection program 300 checks the locality meta-data of the connection (step 340). The locality meta-data includes information indicating whether the connection to the node chosen as the last agent to commit is a local connection or a remote network connection. A local connection may be an integrated component of a system cluster, a system located on a local area network, or a system part of the same sub-network of an IP address, for example. A local connection may not involve network processing components and additional firewalls that may block or delay communication messages, and therefore connection program 300 considers a local connection as more likely to be a reliable connection if it is determined that the connection status is operational.

A remote network connection may be a connection having a different IP address than that of the system hosting the transaction manager of a distributed transaction. Messages to and from a remote network connection transverse network control devices and routing components that may include the ability to block connection requests or terminate connections inactive for a particular period of time. Messages sent across a remote network connection are considered by connection program 300 to incur longer delays and be less reliable than local connections. Connection program 300 accesses the information of locality meta-data 220 (FIG. 2).

Having accessed locality meta-data information of a participating node selected as the last agent of a last agent commit optimization process, connection program 300 determines if the connection is local (decision step 350). Determining, from the locality meta-data, the connection to the node selected as the last agent to commit, to be a local connection (step 350, "YES" branch), connection program 300 sends a message to the transaction manager (TM) to proceed with using the last agent commit optimization process (step 360). For example, connection program 300 determines from locality meta-data 220 that the node selected as the last agent is a local connection, on the same sub-network, which indicates to connection program 300 that the node connection is likely to be reliable. Connection program 300 advises the transaction manager to proceed with the use of the last agent commit optimization process and continue for the transaction, as the likelihood of an in-doubt condition occurring is low.

Having determined from the locality meta-data, the connection to the node selected as the last agent to commit, to be a remote network connection (step 350, "NO" branch), connection program 300 advises the transaction manager to proceed with standard two phase commit processing (step 380), and continue as described above. For example, connection program 300 has determined that a connection to remote resource manager 130, is a remote network connection, by accessing information regarding the connection to remote resource manager 130 in locality meta-data 220. The connection has been selected as the last agent of a last agent commit optimization process by transaction manager 115. Connection program 300 sends instruction to transaction manager 115 to abort the last agent commit optimization process and proceed with a standard two phase commit process to perform the transaction units of work, due to the information in locality meta-data 220 indicating remote resource manager 130 as a remote connection. Having sent the message to transaction manager 115, connection program 300 ends.

Figure 4:
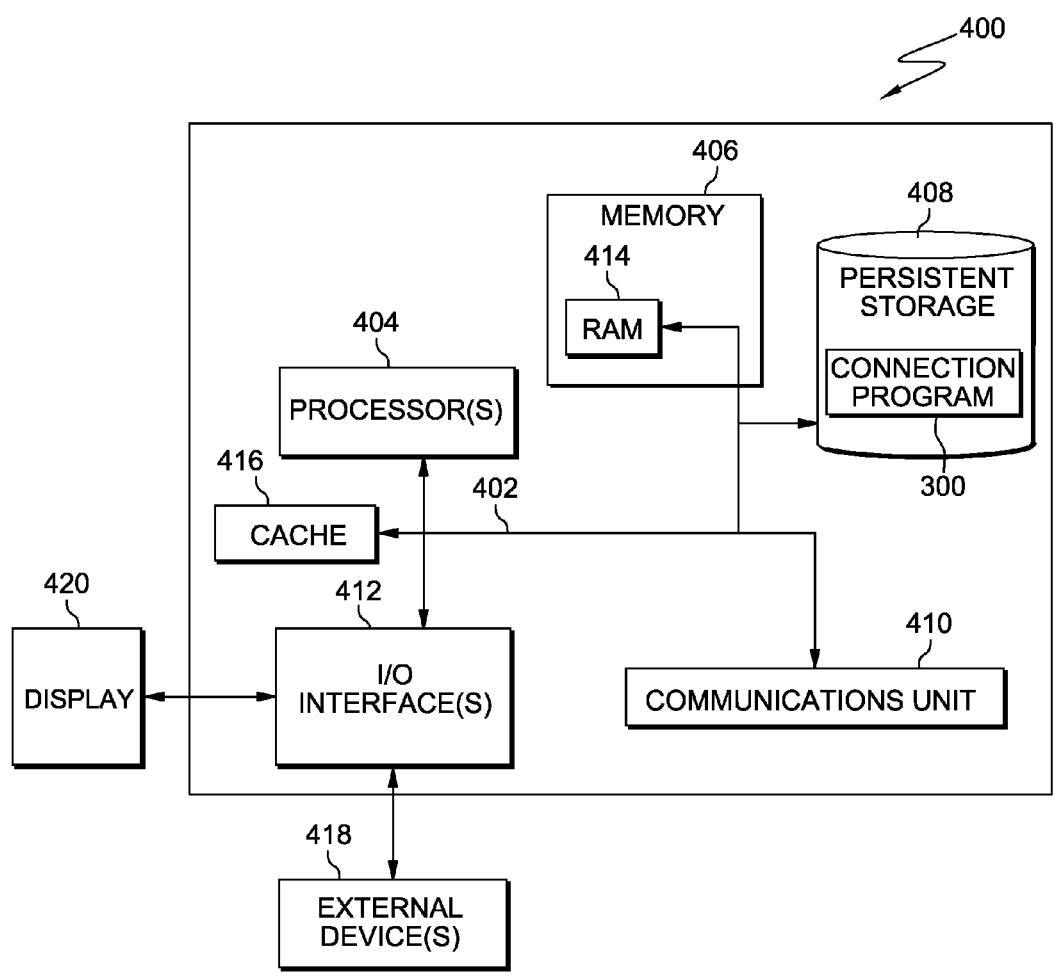
FIG. 4 depicts a block diagram of components of a computing device capable of operating the connection program, in accordance with an embodiment of the present invention.

FIG. 4 depicts a block diagram of components of computing device 400 capable of operating connection program 300, in accordance with an embodiment of the present invention. It should be appreciated that FIG. 4 provides only an illustration of one implementation and does not imply any limitations with regard to the environments in which different embodiments may be implemented. Many modifications to the depicted environment may be made.

Computing device 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Connection program 300 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of distributed communication processing environment 100. In these examples, communications unit 410 includes one or more network interface cards. Communications unit 410 may provide communications through the use of either or both physical and wireless communications links. Connection program 300 may be downloaded to persistent storage 408 through communications unit 410.

I/O interface(s) 412 allows for input and output of data with other devices that may be connected to computing device 400. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., connection program 300 can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for resolving a potential in-doubt condition of a distributed transaction, the computer program product comprising:
a computer readable storage medium having program instructions embodied therewith, wherein the program instructions are executable by a computer processor to cause the computer processor to perform a method comprising:
receiving a request to commit a transaction of a distributed transaction protocol that includes an applied process, the transaction includes at least a coordinating node and a participating node;
determining a service status of a connection to the participating node;
in response to determining the service status of the connection to the participating node to be unavailable, instructing the coordinating node to back-out the transaction;
determining a reliability of the connection of the participating node, based on meta-data corresponding to the participating node, wherein the meta-data indicates whether the locality of the participating node is a remote network connection, and whether the remote network connection includes a connection to a sub-network that is a different sub-network than that of the coordinating node of the transaction;
in response to determining the locality of the connection of the participating node is a remote network connection, and the locality of the remote network connection includes a connection to a sub-network that is a different sub-network than that of the coordinating node, communicating to the coordinating node to abort the applied process of the distributed transaction protocol and alternatively perform a standard two phase commit protocol process; and
in response to determining the locality of the connection of the participating node is a local network connection, transferring a decision to commit the transaction from the coordinating node to the participating node.

2. The computer program product of claim 1, wherein the distributed transaction protocol is a two phase commit protocol and the applied process is an optimization process.

3. The computer program product of claim 2 wherein the optimization process is a last agent commit optimization process for a two phase commit protocol.

4. The computer program product of claim 1, wherein determining the service status of the connection to the participating node is not available, is based on the service status of the connection that remains unavailable subsequent to sending a message, external to the transaction, to the participating node.

5. A computer system for resolving a potential in-doubt condition of a distributed transaction, the computer system comprising:
one or more computer processors;
one or more computer readable storage media; and
program instructions stored on the computer readable storage media for execution by at least one of the one or more processors, the program instructions comprising:
program instructions to receive a request to commit a transaction of a distributed transaction protocol that includes an applied process, the transaction includes at least a coordinating node and a participating node;
program instructions to determine, by the processor, a service status of a connection to the participating node; and
in response to determining the service status of the connection to the participating node to be unavailable, program instructions to instruct the coordinating node to back-out the transaction;
program instructions to determine a reliability of the connection of the participating node, based on meta-data corresponding to the participating node, wherein the meta-data indicated whether the locality of the participating node is a remote network connection, and whether the remote network connection includes a connection to a sub-network that is a different sub-network than that of the coordinating node of the transaction;
in response to determining the locality of the connection of the participating node is a remote network connection, and the locality of the remote network connection includes a connection to a sub-network that is a different sub-network than that of the coordinating node, program instructions to communicate to the coordinating node to abort the applied process of the distributed transaction protocol and alternatively perform a standard two phase commit protocol process; and
in response to determining the locality of the connection of the participating node is a local network connection, program instructions to transfer a decision to commit the transaction from the coordinating node to the participating node.

6. The computer system of claim 5, wherein the distributed transaction protocol is a two phased commit protocol, and the applied process is a last agent commit optimization process for the two phase commit protocol and the at least one participating node is a last agent of the last agent commit optimization process.

7. The computer system of claim 5, wherein determining the service status of the connection to the participating node is not available, is based on the service status of the connection that remains unavailable subsequent to sending a message, external to the transaction, to the participating node.

* * * * *